(12) United States Patent
Eisen et al.

(10) Patent No.: US 9,665,372 B2
(45) Date of Patent: *May 30, 2017

(54) PARALLEL SLICE PROCESSOR WITH DYNAMIC INSTRUCTION STREAM MAPPING

(71) Applicant: INTERNATIONAL BUSINESS MACHINES CORPORATION, Armonk, NY (US)

(72) Inventors: Lee Evan Eisen, Round Rock, TX (US); Hung Qui Le, Austin, TX (US); Jentje Leenstra, Bondorf (DE); Jose Eduardo Moreira, Irvington, NY (US); Bruce Joseph Ronchetti, Austin, TX (US); Brian William Thompto, Austin, TX (US); Albert James Van Norstrand, Jr., Round Rock, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 161 days.

This patent is subject to a terminal disclaimer.

(21) Appl. No.: 14/274,927

(22) Filed: May 12, 2014

(65) Prior Publication Data
US 2015/0324204 A1    Nov. 12, 2015

(51) Int. Cl.
G06F 9/38    (2006.01)
G06F 9/46    (2006.01)
(Continued)

(52) U.S. Cl.
CPC .............. *G06F 9/38* (2013.01); *G06F 9/3836* (2013.01); *G06F 9/3851* (2013.01);
(Continued)

(58) Field of Classification Search
CPC .. G06F 9/3851; G06F 9/30149; G06F 9/3867; G06F 9/3873; G06F 9/38;
(Continued)

(56) References Cited

U.S. PATENT DOCUMENTS

| 4,858,113 A | 8/1989 | Saccardi |
| 5,055,999 A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

U.S. Appl. No. 14/274,942, filed May 12, 2014, Eisen, et al.
(Continued)

*Primary Examiner* — Daniel Pan
(74) *Attorney, Agent, or Firm* — Mitch Harris, Atty at Law, LLC; Andrew M. Harris; Steven L. Bennett (57) ABSTRACT

A processor core having multiple parallel instruction execution slices and coupled to multiple dispatch queues by a dispatch routing network provides flexible and efficient use of internal resources. The dispatch routing network is controlled to dynamically vary the relationship between the slices and instruction streams according to execution requirements for the instruction streams and the availability of resources in the instruction execution slices. The instruction execution slices may be dynamically reconfigured as between single-instruction-multiple-data (SIMD) instruction execution and ordinary instruction execution on a per-instruction basis, permitting the mixture of those instruction types. Instructions having an operand width greater than the width of a single instruction execution slice may be processed by multiple instruction execution slices (Continued)

configured to act in concert for the particular instructions. When an instruction execution slice is busy processing a current instruction for one of the streams, another slice can be selected to proceed with execution.

16 Claims, 9 Drawing Sheets

(51) Int. Cl.
*G06F 15/80* (2006.01)
*G06F 9/30* (2006.01)
*G06F 9/50* (2006.01)
*G06F 9/48* (2006.01)

(52) U.S. Cl.
CPC .......... *G06F 9/3867* (2013.01); *G06F 9/3887* (2013.01); *G06F 9/30149* (2013.01); *G06F 9/3873* (2013.01); *G06F 9/4881* (2013.01); *G06F 9/505* (2013.01); *G06F 9/5066* (2013.01); *G06F 9/5083* (2013.01)

(58) Field of Classification Search
CPC ...... G06F 9/505; G06F 9/5083; G06F 9/5066; G06F 9/4881
See application file for complete search history.

(56) References Cited

U.S. PATENT DOCUMENTS

| | | | |
|---|---|---|---|
| 5,095,424 A | 3/1992 | Woffinden et al. | |
| 5,471,593 A | 11/1995 | Branigin | |
| 5,475,856 A | 12/1995 | Kogge | |
| 5,553,305 A * | 9/1996 | Gregor et al. | G06F 9/4843 710/20 |
| 5,630,149 A | 5/1997 | Bluhm | |
| 5,680,597 A * | 10/1997 | Kumar et al. | G06F 9/30043 712/13 |
| 5,822,602 A | 10/1998 | Thusoo | |
| 5,996,068 A | 11/1999 | Dwyer, III et al. | |
| 6,044,448 A | 3/2000 | Agrawal et al. | |
| 6,073,215 A | 6/2000 | Snyder | |
| 6,073,231 A | 6/2000 | Bluhm et al. | |
| 6,092,175 A | 7/2000 | Levy et al. | |
| 6,112,019 A | 8/2000 | Chamdani et al. | |
| 6,119,203 A | 9/2000 | Snyder et al. | |
| 6,138,230 A | 10/2000 | Hervin et al. | |
| 6,145,054 A | 11/2000 | Mehrotra et al. | |
| 6,170,051 B1 | 1/2001 | Dowling | |
| 6,212,544 B1 | 4/2001 | Borkenhagen et al. | |
| 6,286,027 B1 | 9/2001 | Dwyer, III et al. | |
| 6,311,261 B1 | 10/2001 | Chamdani et al. | |
| 6,336,183 B1 | 1/2002 | Le et al. | |
| 6,356,918 B1 | 3/2002 | Chuang et al. | |
| 6,381,676 B2 | 4/2002 | Aglietti et al. | |
| 6,425,073 B2 | 7/2002 | Roussel et al. | |
| 6,463,524 B1 | 10/2002 | Delaney et al. | |
| 6,549,930 B1 | 4/2003 | Chrysos et al. | |
| 6,564,315 B1 | 5/2003 | Keller et al. | |
| 6,728,866 B1 | 4/2004 | Kahle et al. | |
| 6,732,236 B2 | 5/2004 | Favor | |
| 6,839,828 B2 | 1/2005 | Gschwind et al. | |
| 6,847,578 B2 | 1/2005 | Ayukawa et al. | |
| 6,868,491 B1 | 3/2005 | Moore | |
| 6,883,107 B2 | 4/2005 | Rodgers et al. | |
| 6,948,051 B2 | 9/2005 | Rivers et al. | |
| 6,954,846 B2 | 10/2005 | Leibholz et al. | |
| 6,978,459 B1 * | 12/2005 | Dennis et al. | G06F 9/52 718/100 |
| 7,020,763 B2 | 3/2006 | Saulsbury et al. | |
| 7,024,543 B2 | 4/2006 | Grisenthwaite et al. | |
| 7,086,053 B2 | 8/2006 | Long et al. | |
| 7,114,163 B2 | 9/2006 | Hardin et al. | |
| 7,124,160 B2 | 10/2006 | Saulsbury et al. | |
| 7,155,600 B2 | 12/2006 | Burky et al. | |
| 7,191,320 B2 | 3/2007 | Hooker et al. | |
| 7,263,624 B2 | 8/2007 | Marchand et al. | |
| 7,290,261 B2 | 10/2007 | Burky et al. | |
| 7,302,527 B2 | 11/2007 | Barrick et al. | |
| 7,386,704 B2 | 6/2008 | Schulz et al. | |
| 7,469,318 B2 | 12/2008 | Chung et al. | |
| 7,478,225 B1 | 1/2009 | Brooks et al. | |
| 7,512,724 B1 | 3/2009 | Dennis et al. | |
| 7,565,652 B2 | 7/2009 | Janssen et al. | |
| 7,600,096 B2 | 10/2009 | Parthasarathy et al. | |
| 7,669,035 B2 | 2/2010 | Young et al. | |
| 7,669,036 B2 | 2/2010 | Brown et al. | |
| 7,694,112 B2 | 4/2010 | Barowski et al. | |
| 7,721,069 B2 | 5/2010 | Ramchandran et al. | |
| 7,793,278 B2 | 9/2010 | Du et al. | |
| 7,836,317 B2 | 11/2010 | Marchand et al. | |
| 7,889,204 B2 | 2/2011 | Hansen et al. | |
| 7,926,023 B2 | 4/2011 | Okawa et al. | |
| 7,975,134 B2 | 7/2011 | Gonion | |
| 7,987,344 B2 | 7/2011 | Hansen et al. | |
| 8,046,566 B2 | 10/2011 | Abernathy et al. | |
| 8,074,224 B1 | 12/2011 | Nordquist et al. | |
| 8,099,556 B2 | 1/2012 | Ghosh et al. | |
| 8,103,852 B2 | 1/2012 | Bishop et al. | |
| 8,108,656 B2 | 1/2012 | Katragadda et al. | |
| 8,135,942 B2 | 3/2012 | Abernathy et al. | |
| 8,141,088 B2 | 3/2012 | Morishita et al. | |
| 8,166,282 B2 | 4/2012 | Madriles et al. | |
| 8,250,341 B2 | 8/2012 | Schulz et al. | |
| 8,386,751 B2 | 2/2013 | Ramchandran et al. | |
| 8,464,025 B2 | 6/2013 | Yamaguchi et al. | |
| 8,555,039 B2 | 10/2013 | Rychlik | |
| 8,683,182 B2 | 3/2014 | Hansen et al. | |
| 8,713,263 B2 | 4/2014 | Bryant | |
| 8,966,232 B2 | 2/2015 | Tran | |
| 8,984,264 B2 | 3/2015 | Karlsson et al. | |
| 2002/0194251 A1 | 12/2002 | Richter et al. | |
| 2004/0111594 A1 | 6/2004 | Feiste et al. | |
| 2004/0181652 A1 * | 9/2004 | Ahmed et al. | G06F 9/30036 712/215 |
| 2004/0216101 A1 | 10/2004 | Burky et al. | |
| 2007/0022277 A1 | 1/2007 | Iwamura et al. | |
| 2008/0133885 A1 | 6/2008 | Glew | |
| 2008/0313424 A1 | 12/2008 | Gschwind | |
| 2009/0037698 A1 | 2/2009 | Nguyen | |
| 2009/0113182 A1 | 4/2009 | Abernathy et al. | |
| 2010/0100685 A1 | 4/2010 | Kurosawa et al. | |
| 2012/0110271 A1 | 5/2012 | Boersma et al. | |
| 2014/0215189 A1 | 7/2014 | Airaud et al. | |
| 2014/0244239 A1 | 8/2014 | Nicholson et al. | |
| 2015/0324206 A1 * | 11/2015 | Eisen et al. | G06F 9/3867 712/215 |

FOREIGN PATENT DOCUMENTS

| | | |
|---|---|---|
| CN | 101876892 A | 11/2010 |
| CN | 102004719 A | 4/2011 |

OTHER PUBLICATIONS

U.S. Appl. No. 14/302,589, filed Jun. 12, 2014, Eisen, et al.
U.S. Appl. No. 14/300,563, filed Jun. 10, 2014, Eisen, et al.
U.S. Appl. No. 14/594,716, filed Jan. 12, 2015, Eisen, et al.
U.S. Appl. No. 14/595,549, filed Jan. 13, 2015, Brownscheidle, et al.
U.S. Appl. No. 14/595,635, filed Jan. 13, 2015, Ayub, et al.
U.S. Appl. No. 14/480,680, filed Sep. 9, 2014, Boersma, et al.
U.S. Appl. No. 14/574,644, filed Dec. 18, 2014, Boersma, et al.
Pechanek, et al., "ManArray Processor Interconnection Network: An Introduction", Euro-Par' 99 Parallel Processing, Lecture Notes in Computer Science, 5th International Euro-Par Conference, Aug. 31-Sep. 3, 1999 Proceedings, pp. 761-765, vol. 1685, Spring Berlin Heidelberg, Toulouse, France.
Pechanek, et al., "The ManArray Embedded Processor Architecture",Proceedings of the 26th Euromicro Conference, IEEE Computer Society, Sep. 5-7, 2000, pp. 348-355, vol. 1, Maastricht.

(56) References Cited

OTHER PUBLICATIONS

U.S. Appl. No. 14/723,940, filed May 28, 2015, Eisen, et al.
U.S. Appl. No. 14/724,073, filed May 28, 2015, Brownscheidle, et al.
U.S. Appl. No. 14/724,268, filed May 28, 2015, Ayub, et al.
"Method and system for Implementing "Register Threads" in a Simultaneously-Multithreaded (SMT) Processor Core", An IP.com Prior Art Database Technical Disclosure, Authors et. al.: Disclosed Anonymously, IP.com No. IPCOM000199825D, IP.com Electronic Publication: Sep. 17, 2010, pp. 1-4, <http://ip.com/IPCOM/000199825>.
U.S. Appl. No. 14/723,940, dated May 28, 2015, Eisen, et al.
U.S. Appl. No. 14/724,073, dated May 28, 2015, Brownscheidle, et al.
U.S. Appl. No 14/724,268, filed May 28, 2015, Ayob, et al.
U.S. Appl. No. 14/501,152, filed Sep. 30, 2014, Chu, et al.
U.S. Appl. No. 14/869,305, filed Sep. 29, 2015, Chu, et al.
Gebhart et al., "A Hierarchical Thread Scheduler and Register File for Energy-Efficient Throughput Processors", ACM Transactions on Computer Systems, vol. 30, No. 2, Article 8, Publication date: Apr. 2012, pp. 8:1-8:38, © 2012 ACM, <http://doi.acm.org/10.1145/2166879.2166882>.
"Method and system for Implementing "Register Threads" in a Simultaneously-Multithreaded (SMT) Processor Core", An IP.com Prior Art Database Technical Disclosure, Authors et. al.: Disclosed Anonymously, IP.com No. IPCOM000199825D, IP.com Electronic Publication: Sep. 17, 2010, pp. 1-4, <http://ip.com/IPCOM/000199825>.
List of IBM Patents or Patent Applications Treated as Related, 3 pages.
Czajkowski, et al., "Resource Management for Extensible Internet Servers", Proceedings of the 8$^{th}$ ACM SIGOPS European Workshop on Support for Composing Distributed Applications, Sep. 1998, pp. 33-39, ACM, Portugal.
Bridges, et al., "A CPU Utilization Limit for Massively Parallel MIMD Computers", Fourth Symposium on the Frontiers of Massively Parallel Computing, Oct. 19-21, 1992, pp. 83-92, IEEE, VA, US.
International Search Report and Written Opinion in PCT/IB2015/052741 mailed on Oct. 9, 2015, 10 pages (pp. 1-10 in pdf).
Final Office Action in U.S. Appl. No. 14/300,563 mailed on Aug. 12, 2016, 21 pages (pp. 1-21 in pdf).
Notice of Allowance in U.S. Appl. No. 14/300,563 mailed on Oct. 21, 2016, 10 pages (pp. 1-10 in pdf).
List of IBM Patents or Patent Applications Treated as Related, 2 pages.
U.S. Appl. No. 14/274,942, dated May 12, 2014, Eisen, et al.
U.S. Appl. No. 14/302,589, dated Jun. 12, 2014, Eisen, et al.
U.S. Appl. No. 14/300,563, dated Jun. 10, 2014, Eisen, et al.
U.S. Appl. No. 14/594,716, dated Jan. 12, 2015, Eisen, et al.
U.S. Appl. No. 14/595,549, dated Jan. 13, 2015, Brownscheidle, et al.
U.S. Appl. No. 14/595,635, dated Jan. 13, 2015, Ayub, et al.
U.S. Appl. No. 14/480,680, dated Sep. 9, 2014, Boersma, et al.
U.S. Appl. No. 14/574,644, dated Dec. 18, 2014, Boersma, et al.
Pechanek, et al., "ManArray Processor Interconnection Network: an Introduction", Euro-Par' 99 Parallel Processing, Lecture Notes in Computer Science, 5th International Euro-Par Conference, Aug. 31-Sep. 3, 1999 Proceedings, pp. 761-765, vol. 1685, Spring Berlin Heidelberg, Toulouse, France.
Pechanek, et al., "The ManArray Embedded Processor Architecture",Proceedings of the 26$^{th}$ Euromicro Conference, IEEE Computer Society, Sep. 5-7, 2000, pgs. 348-355, vol. 1, Maastricht.
List of IBM Patents or Patent Applications Treated as Related, 1 page.

* cited by examiner

PARALLEL SLICE PROCESSOR WITH DYNAMIC INSTRUCTION STREAM MAPPING

BACKGROUND OF THE INVENTION

1. Field of the Invention

The present invention is related to processing systems and processors, and more specifically to a pipelined processor core with dynamic instruction stream mapping.

2. Description of Related Art

In present-day processor cores, pipelines are used to execute multiple hardware threads corresponding to multiple instruction streams, so that more efficient use of processor resources can be provided through resource sharing and by allowing execution to proceed even while one or more hardware threads are waiting on an event.

In existing systems, specific resources and pipelines are typically allocated for execution of the different instruction streams and multiple pipelines allow program execution to continue even during conditions when a pipeline is busy. However, resources are still tied up for pipelines that are busy, and when all the pipeline(s) assigned to an instruction stream are busy, the instruction stream is stalled, reducing the potential throughput of the processor core.

It would therefore be desirable to provide a processor core for processing program instructions that provides improved flexibility and throughput.

BRIEF SUMMARY OF THE INVENTION

The invention is embodied in a processor core and a computer system. The computer system is a system that includes the processor core.

The processor core includes multiple parallel instruction execution slices for executing multiple instruction streams in parallel and multiple dispatch queues coupled by a dispatch routing network to the execution slices. The dispatch routing network is controlled such that the relationship between the dispatch queues and the instruction execution slices is dynamically varied according to execution requirements for the instruction streams and the availability of resources in the instruction execution slices. In some embodiments, the instruction execution slices may be dynamically reconfigured as between single-instruction-multiple-data (SIMD) instruction execution and ordinary instruction execution on a per-instruction basis, permitting the mixture of those instruction types. In other embodiments, instructions having an operand width greater than the width of a single instruction execution slice may be processed by multiple instruction execution slices dynamically configured to act in concert for the particular instructions requiring greater operand width. In other embodiments, when an instruction execution slice is busy processing one or more previously accepted instructions for one of the streams, another instruction execution slice can be selected to perform execution of a next instruction for the stream, permitting an instruction stream to proceed with execution even while one of the instruction execution slices is stalled.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and processing systems in which conventional pipelines are replaced with execution slices that can be assigned arbitrarily to execute instructions, in particular when a slice executing a current instruction for a stream is busy, and in which slices can be combined on-the-fly to execute either wider instructions or single-instruction-multiple-data (SIMD) instructions requiring multiple slices to handle the multiple data. Multiple dispatch queues are provided to receive multiple instruction streams and the dispatch queues are coupled to the instruction execution slices via a dispatch routing network so that the dispatch routing network can be controlled to perform the above dynamic reconfiguration of the relationship between the instruction execution slices and the dispatch queues according to the availability of the instruction execution slices and/or the requirements for instruction processing. A plurality of cache slices are coupled to the instruction execution slices via a result routing network so that the cache slices can also be varied in relationship with the instruction execution slices according to availability or according to other criteria. The result routing network provides communication of results and operands needed for further processing by instruction execution slices and/or cache slices.

Figure 1:
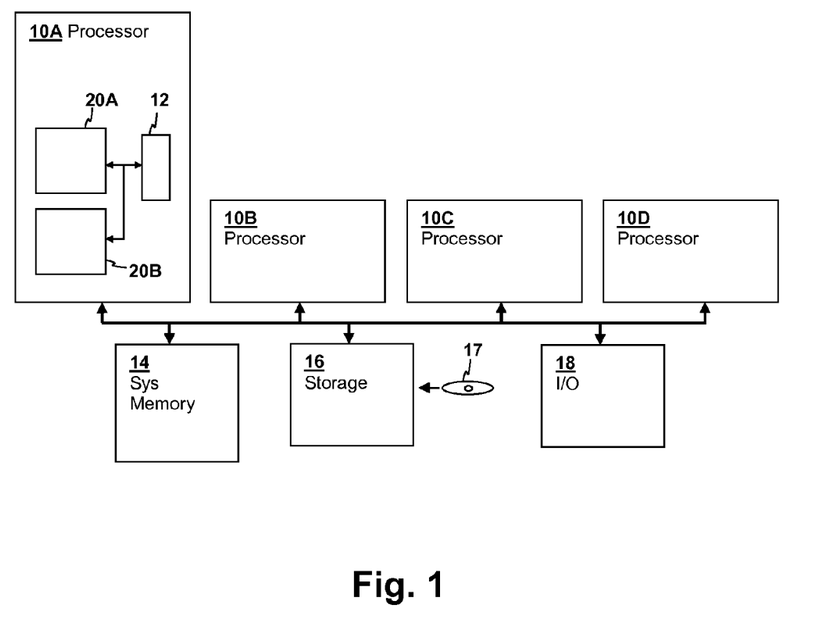
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and a processing system in accordance with other embodiments of the present invention include uni-processor systems having multi-threaded cores. Processors 10A-10D are identical in structure and include cores 20A-20B and local storage 12, which may be a cache level, or a level of internal system memory. Processors 10A-10B are coupled to a main system memory 14, a storage subsystem 16, which includes non-removable drives and optical drives, for reading media such as a CD-ROM 17 forming a computer program product and containing program instructions implementing generally, at least one operating system, associated applications programs, and optionally a hypervisor for controlling multiple operating systems' partitions for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
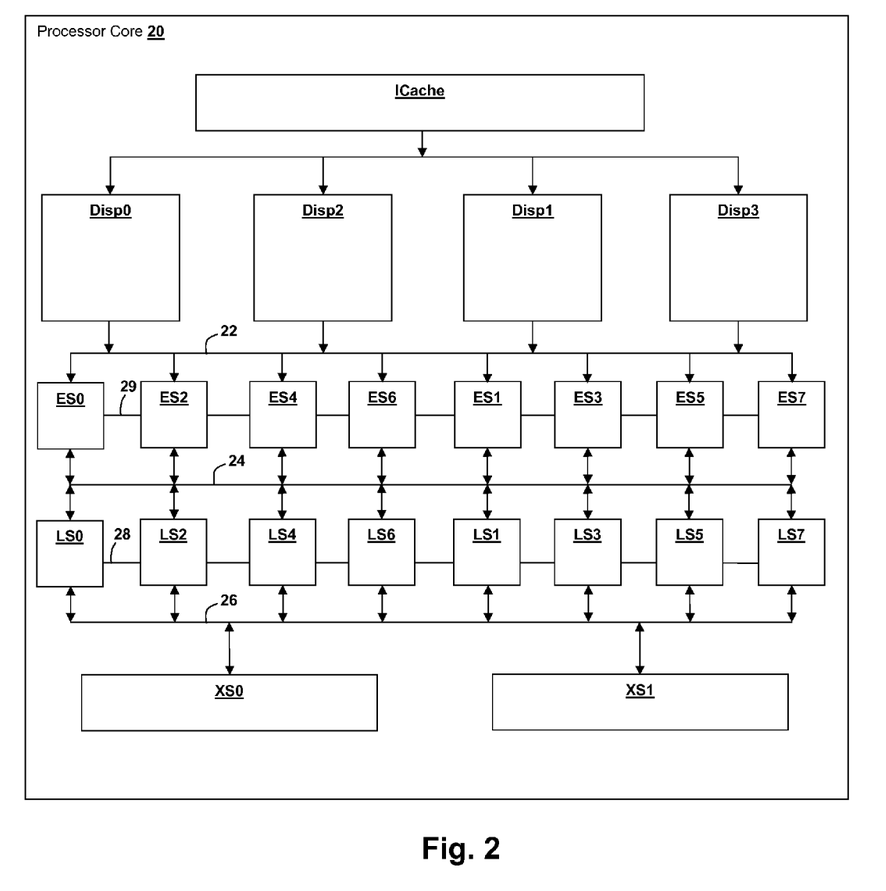
FIG. 2 is a block diagram illustrating details of a processor core 20 that can be used to implement processor cores 20A-20B of FIG. 1.

Referring now to FIG. 2, details of an exemplary processor core 20 that can be used to implement processor cores 20A-20B of FIG. 1 are illustrated. Processor core 20 includes an instruction cache ICache that stores multiple instruction streams fetched from higher-order cache or system memory and presents the instruction stream(s) to a plurality of dispatch queues Disp0-Disp3. Control logic within processor core 20 controls the dispatch of instructions from dispatch queues Disp0-Disp3 to a plurality of instruction execution slices ES0-ES7 via a dispatch routing network 22 that permits instructions from any of dispatch queues Disp0-Disp3 to any of instruction execution slices ES0-ES7, although complete cross-point routing, i.e., routing from any dispatch queue to any slice is not a requirement of the invention. Instruction execution slices ES0-ES7 perform sequencing and execution of logical, mathematical and other operations as needed to perform the execution cycle portion of instruction cycles for instructions in the instructions streams, and may be identical general-purpose instruction execution slices ES0-ES7, or processor core 20 may include special-purpose execution slices ES0-ES7. Instruction execution slices ES0-ES7 may include multiple internal pipelines for executing multiple instructions and/or portions of instructions, so that the indication of "busy" as described herein may also include a condition in which a particular one of instruction execution slices ES0-ES7 is busy processing multiple instructions for a given instruction stream. Instruction execution slices ES0-ES7 are coupled by an execution slice communication network 29 through which values can be exchanged between instruction execution slices ES0-ES7, for example when further processing is performed by one slice on values generated by another execution slice. A fully-routed (or cross-point) network may be used to implement execution slice communication network 29. Alternatively, the connections between instruction execution slices ES0-ES7 may be made only between particular groups of instruction execution slices, e.g., only neighboring slices might be connected in some implementations. Execution slice communication network 29 is also used for tandem execution of SIMD or large-operand instructions that require concurrent/coordinated execution, although execution of such instructions can be performed in a de-coupled manner, as well.

The load-store portion of the instruction execution cycle, (i.e., the operations performed to maintain cache consistency as opposed to internal register reads/writes), is performed by a plurality of cache slices LS0-LS7, which are coupled to instruction execution slices ES0-ES7 by a write-back (result) routing network 24. In the depicted embodiment, any of cache slices LS0-LS7 can be used to perform load-store operation portion of an instruction for any of instruction execution slices ES0-ES7, but that is not a requirement of the invention. Instruction execution slices ES0-ES7 may issue internal instructions concurrently to multiple pipelines, e.g., an instruction execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 24, for example, a port connection may be dedicated to load-store connections to cache slices LS0-LS7, while another port may be used to communicate values to and from other slices, such as special-purposes slices, or other instruction execution slices. Write-back results are scheduled from the various internal pipelines of instruction execution slices ES0-ES7 to write-back port(s) that connect instruction execution slices ES0-ES7 to write-back routing network 24. A load-store routing network 28 couples cache slices LS0-LS7 to provide conversion transfers for execution of SIMD instructions, processing of instructions with data width greater than a width of cache slices LS0-LS7 and other operations requiring translation or re-alignment of data between cache slices LS0-LS7. An I/O routing network 26 couples cache slices LS0-LS7 to a pair of translation slices XS0, XS1 that provide access to a next higher-order level of cache or system memory that may be integrated within, or external to, processor core 20. While the illustrated example shows a matching number of cache slices LS0-LS7 and execution slices ES0-ES7, in practice, a different number of each type of slice can be provided according to resource needs for a particular implementation. As mentioned above, dispatch routing network 22 is a unidirectional network, but can also take the form of a cross-point network as shown, as may load-store routing network 28 and I/O routing network 26.

Figure 3:
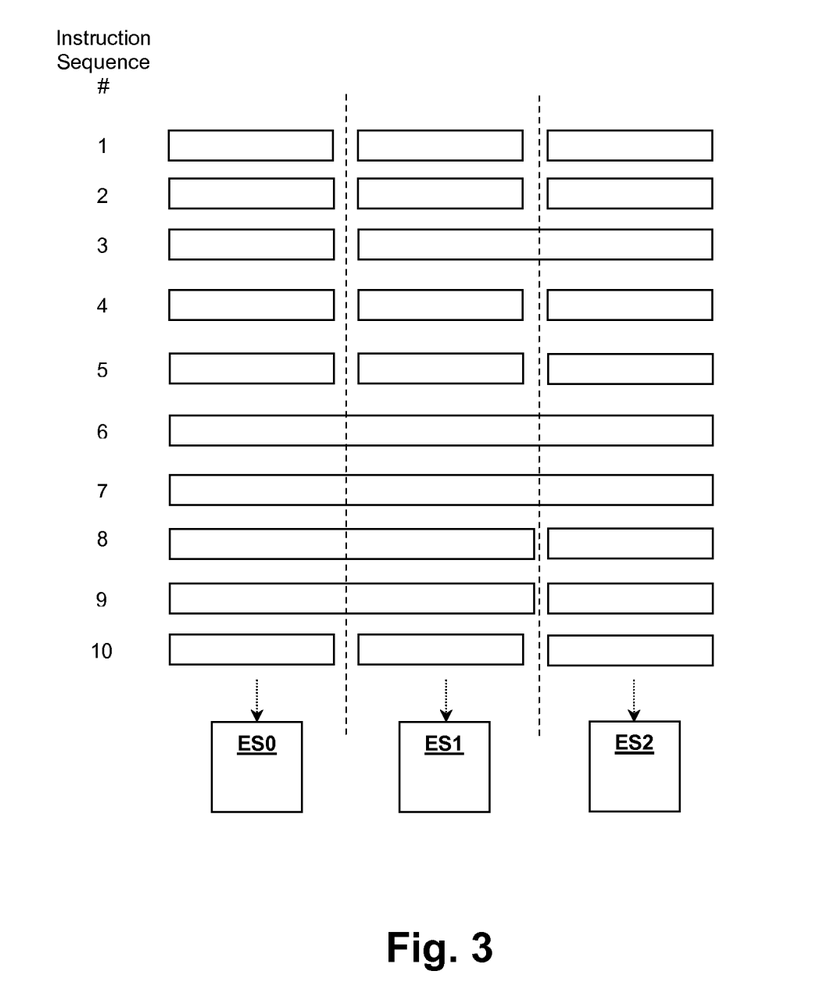
FIG. 3 is a pictorial diagram illustrating a dispatch of instructions by processor core 20.

Referring now to FIG. 3, examples of instruction routing to instruction execution slices ES0, ES1 and ES2 within processor core 20 are shown. In the examples given in this disclosure, it is understood that the instructions dispatched to instruction execution slices may be full external instructions or portions of external instructions, i.e., decoded "internal instructions." Further, in a given cycle, the number of internal instructions dispatched to any of instruction execution slices ES0, ES1 and ES2 may be greater than one and not every one of instruction execution slices ES0, ES1 and ES2 will necessarily receive an internal instruction in a given cycle. FIG. 3 depicts three columns showing sequences of instructions that are sent to instruction execution slices ES0, ES1 and ES2, respectively. Rows correspond to an instruction dispatch sequence of the instructions, and while the rows are aligned for simplicity of illustration, it is understood that in practice that the dispatches will generally not occur simultaneously and there is no constraint between the columns on when an execution slice may complete or receive a particular instruction. In rows 1-2, independent instructions are dispatched to each of instruction execution slices ES0, ES1 and ES2. At row 3, an instruction requiring a wider execution unit is dispatched for execution by dynamically combining instruction execution slices ES1 and ES2, while instruction execution slice ES0 is sent another instruction having a width matching the width of instruction execution slices ES0, ES1 and ES2. At rows 4-5, independent instructions are again dispatched to each of instruction execution slices ES0, ES1 and ES2. In rows 6-7, SIMD instructions having three data values are executed by linking instruction execution slices ES0, ES1 and ES2 to perform the parallel operation, and at rows 8-9, SIMD instructions having two data values are executed by linking instruction execution slices ES0, ES1 while instruction execution slice ES2 is sent other independent instructions. At row 10, instruction execution slices ES0, ES1 and ES2 again commence independent execution of instructions. The examples provided in FIG. 3 are only illustrative and are provided to show the flexibility of dynamic reconfiguration provided in processor core 20. As can be seen, the configurability provides the potential for maintaining all of instruction execution slices ES0-ES7 in an active execution state while performing various types of operations, such as executing SIMD or variable width instruction streams.

Figure 4:
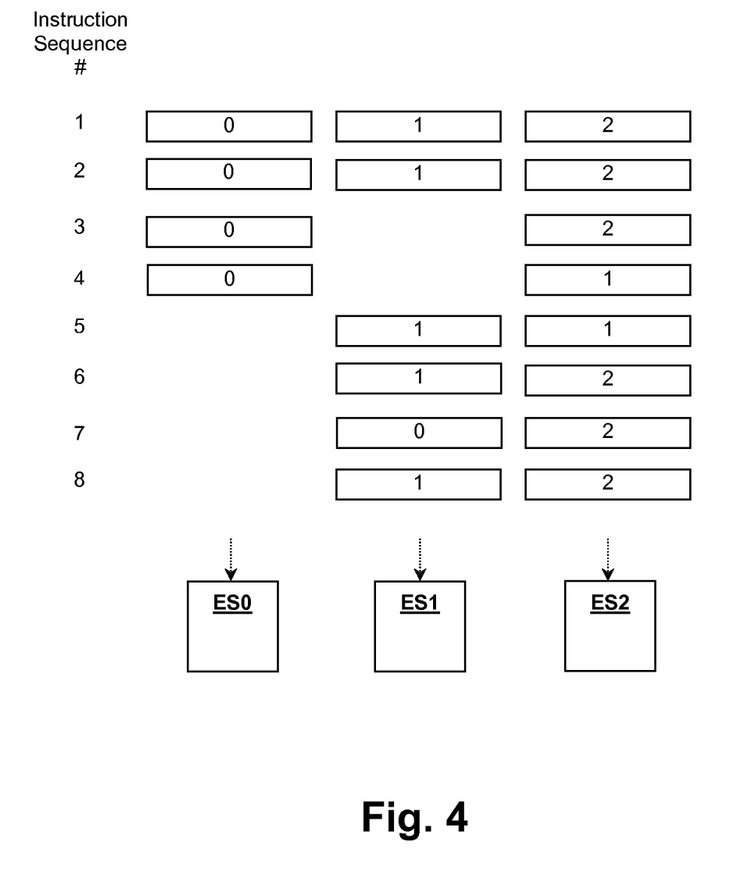
FIG. 4 is a pictorial diagram illustrating another dispatch of instructions by processor core 20.

Referring now to FIG. 4, another example of instruction processing within processor core 20 is shown, and which is illustrated separately in FIG. 4, but that may be combined with any or all of the instruction execution slice reconfigurations provided in the examples of FIG. 3. FIG. 4 depicts three columns showing sequences of instructions that are sent to instruction execution slices ES0, ES1 and ES2, respectively. As in FIG. 3, rows correspond to an instruction sequence and the number shown in each block is the number of an instruction stream numbered from 0 to 2, to which the instructions being executed belong. In rows 1-2, instructions are dispatched to each of instruction execution slices ES0, ES1 and ES2 for each of corresponding instruction streams 0-2. At row 3, instruction execution slice ES1 becomes busy, as instruction execution slice ES1 is still processing the current instruction in instruction stream 1. In row 4, instruction execution slice ES2 is dispatched an instruction for instruction stream 1, either due to a prioritization, round-robin, or other scheme that permits instructions for instruction streams to be routed to instruction execution slices other than a default instruction execution slice for the instruction stream. In Row 5, instruction execution slice ES0 becomes busy after accepting an instruction from row 4, instruction execution slice ES1 is available to accept further instructions, so instruction execution slice ES1 receives dispatch of a next instruction for instruction stream 1. Instruction execution slice ES2 is also executing an instruction for instruction stream 1. In row 6, instruction execution slice ES0 is still busy and instruction execution slices ES1 and ES2 resume execution of instructions for instruction streams 1 and 2, respectively. At row 7, instruction execution slice ES1 is co-opted to execute a next instruction for instruction stream 0, while instruction slice ES0 is still busy executing a current instruction and instruction execution slice ES2 executes another instruction for instruction stream 2. In row 8, instruction execution slice ES1 executes an instruction for instruction stream 1, while instruction execution slice ES2 executes another instruction for instruction stream 2. The examples provided in FIG. 4 are only illustrative and are provided to show the flexibility of mapping of instruction stream dispatches provided in processor core 20. As can be seen, the routable dispatch provides the potential for maintaining all of instruction streams in an active execution state, even while a busy condition is encountered for some execution slices.

Figure 5:
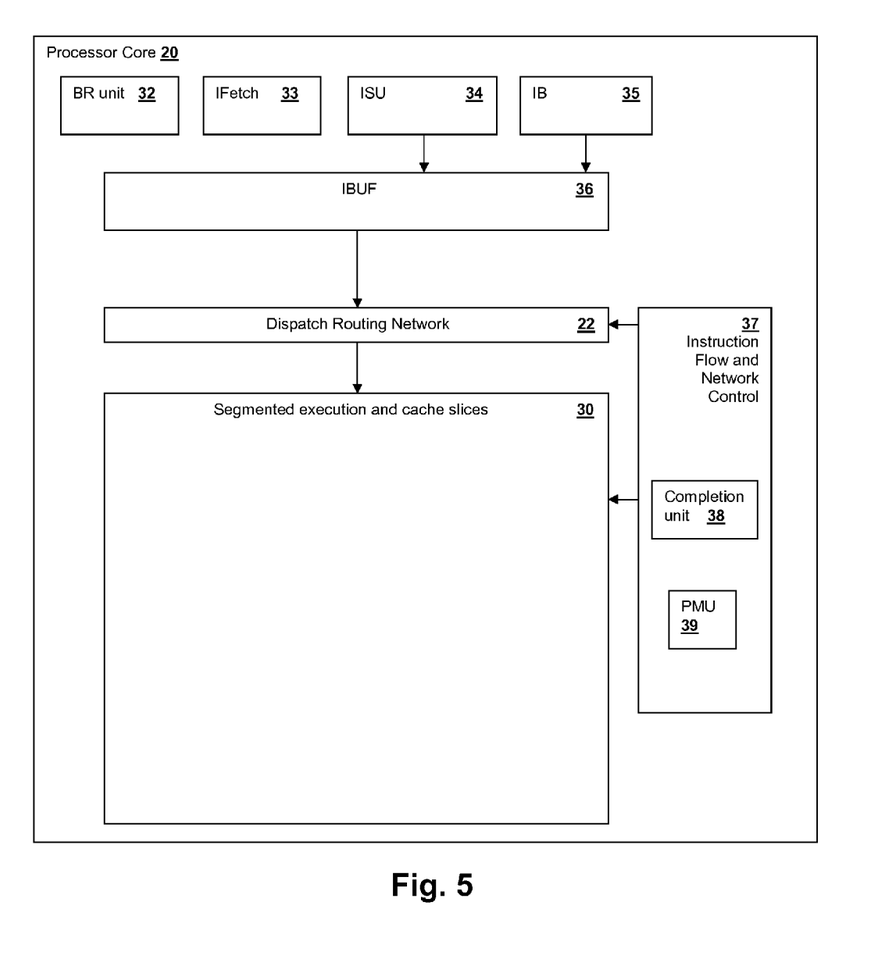
FIG. 5 is a block diagram illustrating details of processor core 20.

Referring now to FIG. 5, further details of processor core 20 are illustrated. Processor core 20 includes a branch execution unit 32, an instruction fetch unit (IFetch) 33 and an instruction sequencer unit (ISU) 34 that control the fetching and sequencing of instructions. A self-learning instruction buffer (IB) 35 groups instructions in order to perform re-configurations such as those shown in FIG. 3, i.e., arranging instructions in the dispatch queues to setup execution of SIMD and variable-width operations. An instruction buffer (IBUF) 36 is partitioned to maintain dispatch queues (Disp0-Disp3 of FIG. 2) for each of the instruction streams and dispatch routing network 22 couples IBUF 36 to the segmented execution and cache slices 30. An instruction flow and network control block 37 performs control of segmented execution and cache slices 30 and dispatch routing network 22 to perform dynamic control of the slices as illustrated in FIG. 3 and FIG. 4, as well as other operations as described in further detail below. An instruction completion unit 38 is also provided to track completion of instructions sequenced by ISU 34 and to control write-back operations by cache slices within segmented execution and cache slices 30. A power management unit 39 provides for energy conservation by reducing or increasing a number of active slices within segmented execution and cache slices 30.

Figure 6:
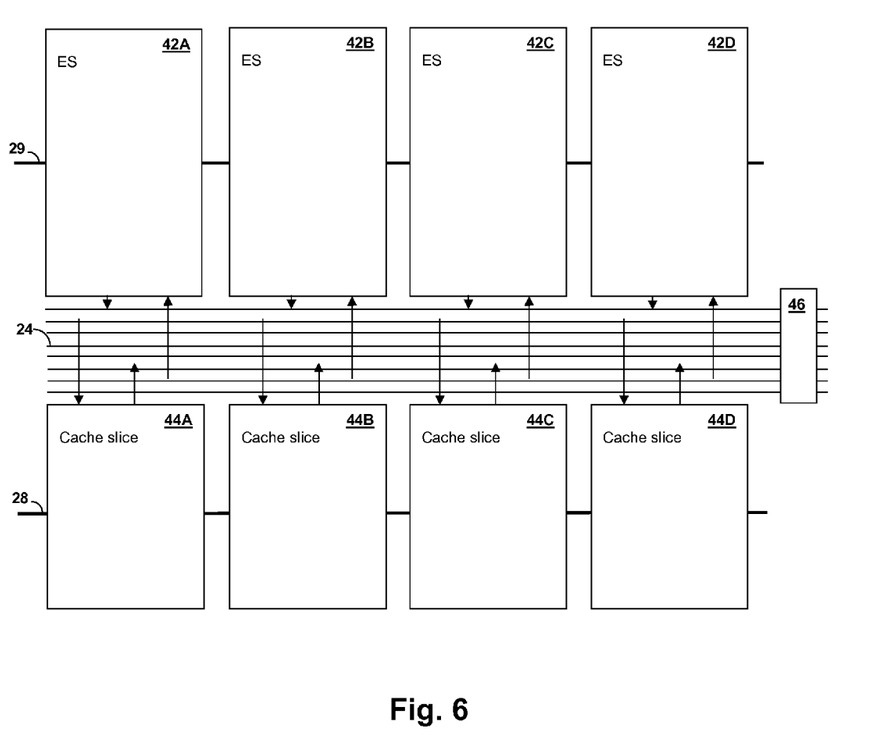
FIG. 6 is a block diagram illustrating details of segmented execution and I/O slices 30 of FIG. 5.

Referring now to FIG. 6, further details of segmented execution and cache slices 30 within processor core 20 are illustrated. Instruction execution slices 42A-42D are representative of, for example, instruction execution slices ES0, ES2, ES4 and ES6 in FIG. 2, and cache slices 44A-44D are representative of cache slices LS0, LS2, LS4 and LS6 in FIG. 2. Write-back routing network 24 takes the form of a cross-pointed set of eight busses that permits simultaneous bidirectional communication between each of instruction execution slices ES0, ES2, ES4 and ES6 and a selected corresponding one of cache slices LS0, LS2, LS4 and LS6. With respect to the bidirectional communication, a cache slice used for write back of results for an instruction execution slice may be different from the cache slice used for loading of data, since, as illustrated in FIGS. 3-4, the sequence of instructions may alternate between instruction streams and under such conditions it will generally be desirable to connect a cache slice to a different instruction execution slice when changing the execution slice used for executing the next instruction in a sequence for an instruction stream. Further, the relationship between cache slices and instruction execution slices may be arbitrarily varied, e.g., for instructions referencing large amounts of data, multiple cache slices may be assigned for loads, while for instructions modifying large numbers of values, multiple cache slices may be assigned for result write-back operations. By providing write-back routing network 24 that supports arbitrary connections between cache slices and instruction execution slices, segmented execution is efficiently supported by enabling transfer of values from one or more generating slices to one or more receiving slices, which may be the same type of slice as the generating slice, or may be another slice type, e.g., special purpose slice(s). A cluster fence 46 provides for coupling write-back routing network to other write-back routing networks of other groups (clusters) of instruction execution slices and cache slices, e.g., instruction execution slices ES1, ES3, ES5 and ES7 and cache slices LS1, LS3, LS5 and LS7.

Figure 7:
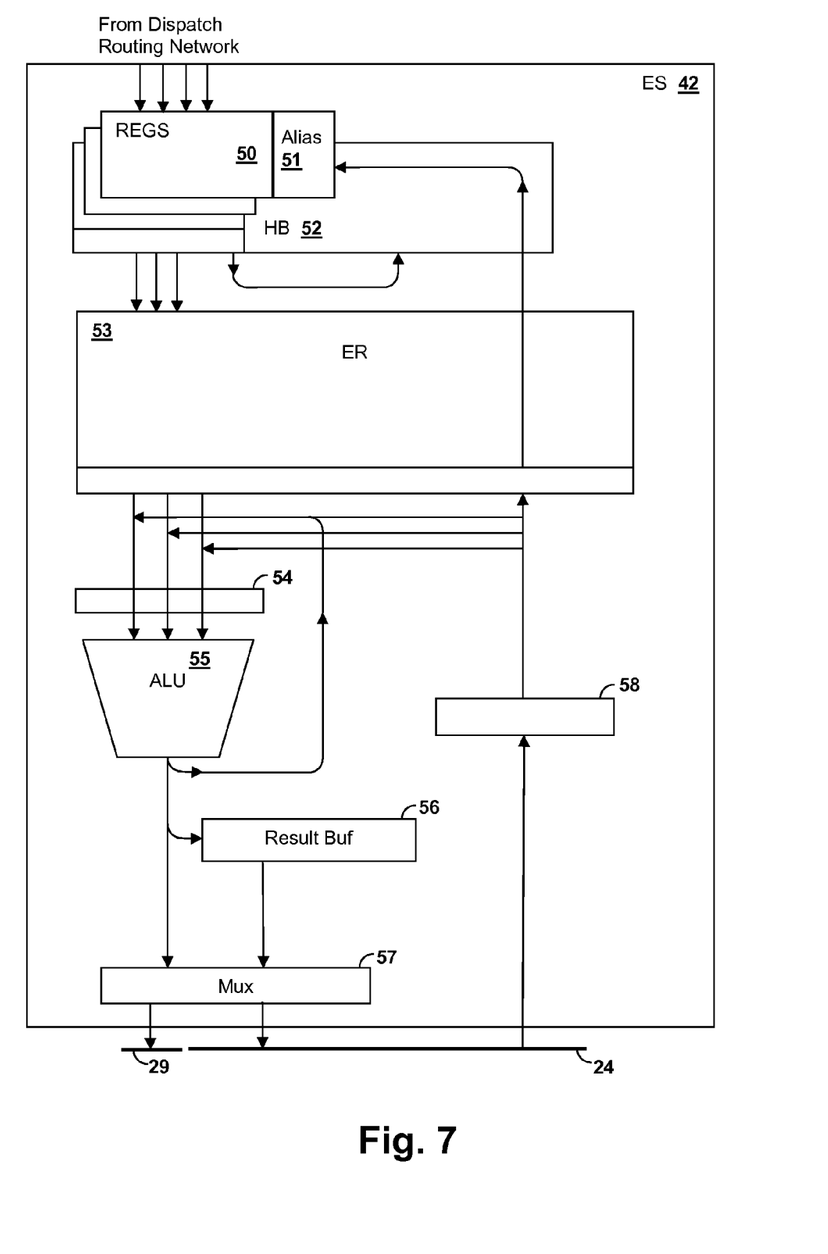
FIG. 7 is a block diagram illustrating details of an instruction execution slice 42 that can be used to implement instruction execution slices 42A-42D of FIG. 6.

Referring now to FIG. 7, an example of an execution slice (ES) 42 that can be used to implement instruction execution slices 42A-42D in FIG. 6 is shown. Inputs from the dispatch queues are received via dispatch routing network 22 by a register array 50 so that operands and the instructions can be queued in the execution reservation stations (ER) 53. Register array 50 is architected to have independent register sets for independent instruction streams or SIMD instructions, while dependent register sets that are clones across multiple instruction execution slices are architected for instances where multiple instruction execution slices are executing non-SIMD instructions or the same segment of an SIMD instruction for the same instruction stream(s). An alias mapper 51 maps the values in register array to any external references, such as write-back values exchanged with other slices over write-back routing network 24. A history buffer HB 52 provides restore capability for register targets of instructions executed by ES 42. Result values selected from write-back routing network 24 and operand values from register array 50 are selected by an arithmetic logic unit (ALU) input multiplexer 54 and operated on by an ALU 55. A result buffer 56 receives results from ALU 55 and a multiplexer 57 makes the value of result buffer 56 available to one or more channels of write-back routing network 24 that can be used by a next ES processing a next instruction for the instruction stream or a cache slice to store the result, depending on the target of the operation. Multiplexer 57 also provides connection to other instruction execution slices via execution slice communication network 29. Write-back routing network 24 is also coupled to ER 53, history buffer 52 and ALU input multiplexer 54 by a write-back buffer 58, so that write-back of resource values, retirement of completed instructions and further computation on results are supported, respectively.

Figure 8:
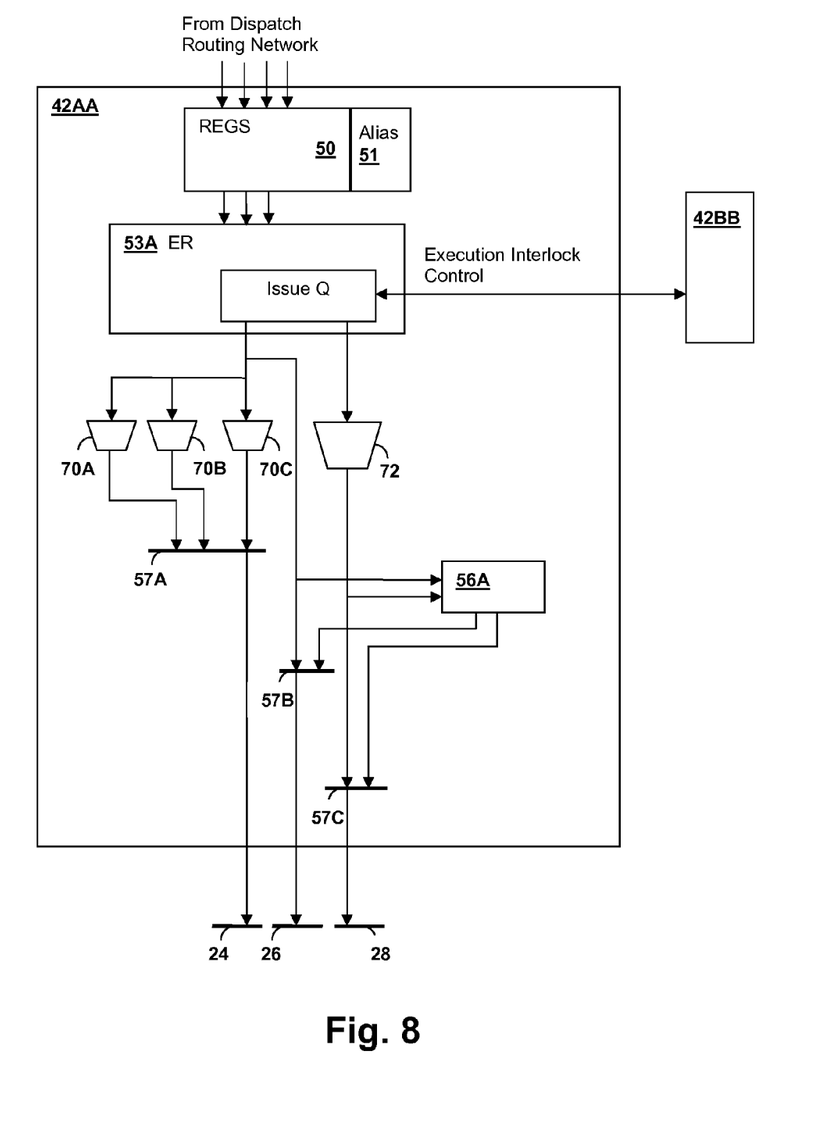
FIG. 8 is a block diagram illustrating details of an alternative instruction execution slice 42AA that can be used to implement instruction execution slices 42A-42D of FIG. 6.

Referring now to FIG. 8, another example of details within an execution slice (ES) 42AA that can be used to implement instruction execution slices 42A-42D in FIG. 6 is shown. Execution slice 42AA is similar to execution slice 42 of FIG. 7, so only differences between them will be described in detail below. Execution slice 42AA is illustrated alongside another execution slice 42BB to illustrate an execution interlock control that may be provided between pairs of execution slices within execution slices ES0-ES7 of FIG. 2, or between other groupings of execution slices, The execution interlock control provides for coordination between execution slices supporting execution of a single instruction stream, since otherwise execution slices ES0-ES7 independently manage execution of their corresponding instruction streams. Execution slice 42AA includes multiple internal execution pipelines 70A-70C and 72 that support out-of-order and simultaneous execution of instructions for the instruction stream corresponding to execution slice 42AA. The instructions executed by execution pipelines 70A-70C and 72 may be internal instructions implementing portions of instructions received over dispatch routing network 22, or may be instructions received directly over dispatch routing network 22, i.e., the pipelining of the instructions may be supported by the instruction stream itself, or the decoding of instructions may be performed upstream of execution slice 42AA. Execution slice 72 is illustrated separately multiplexed to show that single-pipeline, multiple-pipeline or both types of execution units may be provided within execution slice 42AA. The pipelines may differ in design and function, or some or all pipelines may be identical, depending on the types of instructions that will be executed by execution slice 42AA. For example, specific pipelines may be provided for address computation, scalar or vector operations, floating-point operations, etc. Multiplexers 57A-57C provide for routing of execution results to/from result buffer 56A and routing of write-back results to write-back routing network 24, I/O routing network 26 and other routing network(s) 28 that may be provided for routing specific data for sharing between slices or write-back operations sent to one or more of cache slices LS0-LS7.

Figure 9:
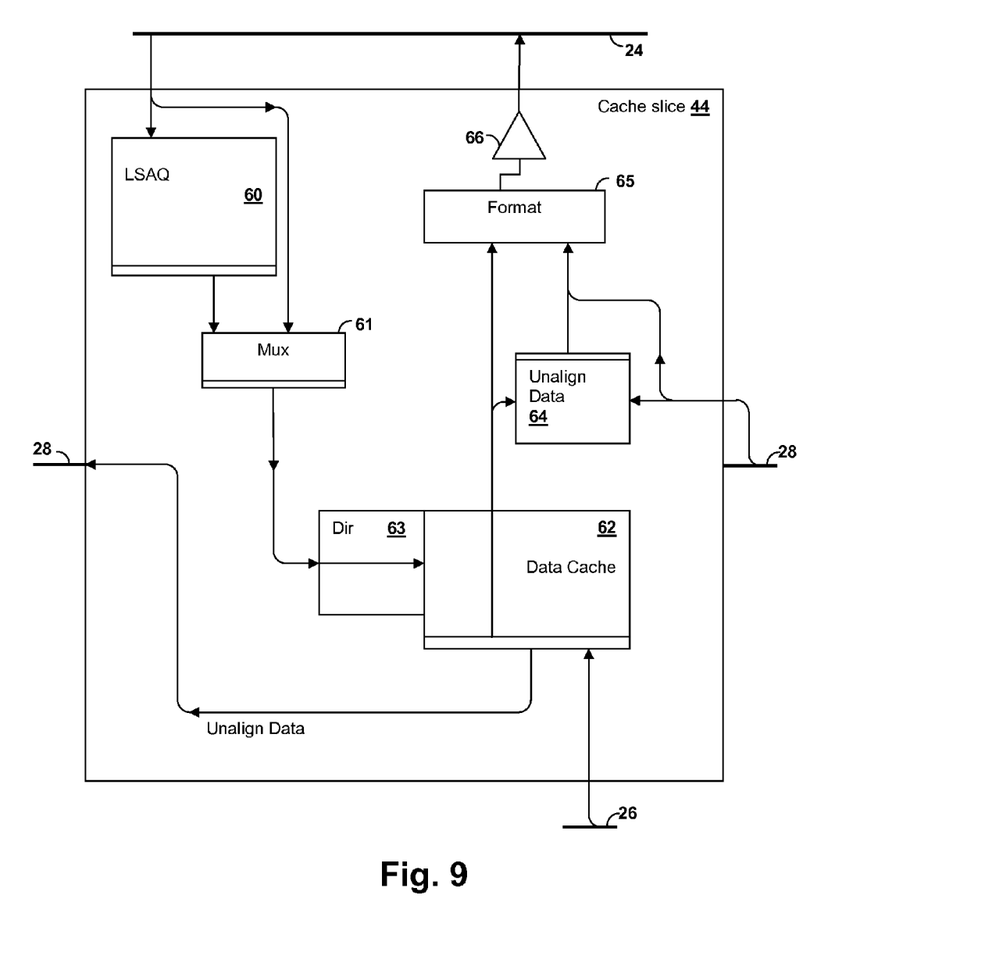
FIG. 9 is a block diagram illustrating details of an instruction execution slice 44 that can be used to implement load-store slices 44A-44D of FIG. 6.

Referring now to FIG. 9, an example of a cache slice (LS Slice) 44 that can be used to implement cache slices 44A-44D in FIG. 6 is shown. A load/store access queue (LSAQ) 60 is coupled to write-back routing network 24, and the direct connection to write-back routing network 24 and LSAQ 60 is selected by a multiplexer 61 that provides an input to a cache directory 63 of a data cache 62 from either LSAQ 60 or from write-back routing network 24. Connections to other cache slices are provided by load-store routing network 28, which is coupled to receive from data cache 62 and to provide data to a data unalignment block 64 of a another slice. A data formatting unit 65 couples cache slice 44 to write-back routing network via a buffer 66, so that write-back results can be written through from one execution slice to the resources of another execution slice. Data cache 62 is also coupled to I/O routing network 26 for loading values from higher-order cache/system memory and for flushing or casting-out values from data cache 62.

While the invention has been particularly shown and described with reference to the preferred embodiments thereof, it will be understood by those skilled in the art that the foregoing and other changes in form, and details may be made therein without departing from the spirit and scope of the invention.

What is claimed is:
1. A processor core, comprising:
a plurality of dispatch queues for receiving instructions of a corresponding plurality of instruction streams, wherein individual ones of the plurality of dispatch queues store the instructions of the corresponding one of the plurality of instruction streams, wherein individual ones of the plurality of dispatch queues have outputs for dispatching the instructions of the corresponding instruction streams;
a plurality of parallel instruction execution slices for executing the plurality of instruction streams in parallel, wherein individual ones of the plurality of parallel instruction execution slices have multiple internal issue queues coupled to multiple internal pipelines corresponding to the multiple internal issue queues that receive instructions of a selected instruction stream for the parallel instruction execution slice in which the individual issue queues and multiple internal pipelines are included, whereby the multiple internal pipelines support out-of-order execution of instructions of an instruction stream selected for execution by the parallel instruction execution slice in parallel as the instructions are received by the multiple internal pipelines from the corresponding issue queue; and
a dispatch routing network having multiple inputs coupled to corresponding ones of the outputs of the dispatch queues for routing the output of the dispatch queues to the instruction execution slices so that there is not a fixed relationship between the instruction streams and the instruction execution slices and such that the routing network dynamically varies the relationship between the dispatch queues and the plurality of parallel instruction execution slices according to execution requirements for the plurality of instruction streams and resource availability in the plurality of parallel instruction execution slices to select from among the plurality of instruction streams one or more selected instruction streams selected for execution by the individual ones of the parallel instruction execution slices, by selecting from which of the instructions streams instructions are sent to the individual ones of the plurality of parallel execution slices, wherein the internal issue queues of the plurality of parallel instruction execution slices receive dispatched instructions of the selected instruction stream selected for execution by the parallel instruction execution slice in which they are included from the dispatch routing network.

2. The processor core of claim 1, further comprising an instruction flow control logic that controls the dispatch routing network to route instructions of the plurality of instruction streams to available ones of the instruction execution slices so that the instruction execution slices are shared across the plurality of instruction streams.

3. The processor core of claim 2, wherein the instruction flow control logic, in response to determining that a first one of the instruction execution slices is executing a current instruction for a first one of the instruction streams, routes a next instruction for the first one of the instruction streams to another one of the instruction execution slices.

4. The processor core of claim 1, wherein two or more of the instruction execution slices are dynamically combinable to execute one or more instructions requiring a first execution unit bit width greater than a bit width of individual ones of the two or more instruction execution slices, wherein resources of the instruction execution slices used for executing the one or more instructions are also used when separately executing instructions requiring a second execution bit width equal to the bit width of the individual ones of the two or more instruction execution slices.

5. The processor core of claim 4, wherein the one or more instructions requiring a pipeline width greater than the individual ones of the two or more instruction execution pipelines are single-instruction multiple data (SIMD) instructions requiring greater pipeline width to process multiple data values operated on by the instructions.

6. The processor core of claim 1, further comprising a result routing network coupling the plurality of execution slices, wherein execution results for a given one of the instruction streams are shared across multiple ones of the instruction execution slices.

7. The processor core of claim 6, further comprising a plurality of cache slices coupled to the result routing network, wherein the cache slices include a load-store unit for loading and storing values including values corresponding to the execution results.

8. A computer system, comprising:
at least one processor core for executing program instructions of a corresponding plurality of instruction streams; and
a memory coupled to the processor core for storing the program instructions, wherein the at least one processor core comprises a plurality of dispatch queues for receiving the program instructions, wherein individual ones of the plurality of dispatch queues store the program instructions of the corresponding instruction stream, wherein individual ones of the plurality of dispatch queues have outputs for dispatching the program instructions of the corresponding instruction stream, a plurality of parallel instruction execution slices for executing the plurality of instruction streams in parallel, wherein individual ones of the plurality of parallel instruction execution slices have multiple internal issue queues coupled to multiple internal pipelines corresponding to the multiple internal issue queues that receive instructions of a selected instruction stream for the parallel instruction execution slice in which the individual issue queues and multiple internal pipelines are included, whereby the multiple internal pipelines support out-of-order execution of instructions of the instruction stream selected for execution by the parallel instruction execution slice in parallel as the instructions are received from the corresponding issue queue, and a dispatch routing network having multiple inputs coupled to corresponding ones of the outputs of the dispatch queues for routing the output of the dispatch queues to the instruction execution slices so that there is not a fixed relationship between the instruction streams and the instruction execution slices and such that the routing network is controlled to dynamically vary the relationship between the dispatch queues and the plurality of parallel instruction execution slices according to execution requirements for the plurality of instruction streams and resource availability in the plurality of parallel instruction execution slices to select from among the plurality of instruction streams one or more selected instruction streams selected for execution by the individual ones of the parallel instruction execution slices, by selecting from which one of the instructions streams program instructions are sent to the individual ones of the plurality of parallel execution slices, wherein the internal issue queues of the plurality of parallel instruction execution slices receive dispatched instructions of the instruction stream selected for execution by the parallel instruction execution slice in which they are included from the dispatch routing network.

9. The computer system of claim 8, wherein the at least one processor core further comprises an instruction flow control logic that controls the dispatch routing network to route instructions of the plurality of instruction streams to available ones of the instruction execution slices so that the instruction execution slices are shared across the plurality of instruction streams.

10. The computer system of claim 9, wherein the instruction flow control logic, in response to determining that a first one of the instruction execution slices is executing a current instruction for a first one of the instruction streams, routes a next instruction for the first one of the instruction streams to another one of the instruction execution slices.

11. The computer system of claim 8, wherein two or more of the instruction execution slices are dynamically combinable to execute one or more instructions requiring a first execution unit bit width greater than a bit width of individual ones of the two or more instruction execution slices, wherein resources of the instruction execution slices used for executing the one or more instructions are also used when separately executing instructions requiring a second execution bit width equal to the bit width of the individual ones of the two or more instruction execution slices.

12. The computer system of claim 11, wherein the one or more instructions requiring a pipeline width greater than the individual ones of the two or more instruction execution pipelines are single-instruction multiple data (SIMD) instructions requiring greater pipeline width to process multiple data values operated on by the instructions.

13. The computer system of claim 8, wherein the at least one processor core further comprises a result routing network coupling the plurality of execution slices, wherein execution results for a given one of the instruction streams are shared across multiple ones of the instruction execution slices.

14. The computer system of claim 13, wherein the at least one processor core further comprises a plurality of cache slices coupled to the result routing network, wherein the cache slices include a load-store unit for loading and storing values including values corresponding to the execution results.

15. A processor core, comprising:
a plurality of dispatch queues for receiving instructions of a corresponding plurality of instruction streams;
a plurality of parallel instruction execution slices for executing the plurality of instruction streams in parallel, wherein individual ones of the plurality of parallel instruction execution slices have multiple internal issue queues coupled to multiple internal pipelines corresponding to the multiple internal issue queues that receive instructions of a selected instruction stream for the parallel instruction execution slice in which the individual issue queues and multiple internal pipelines are included, whereby the multiple internal pipelines support out-of-order execution of instructions of an instruction stream selected for execution by the parallel instruction execution slice in parallel as the instructions are received by the multiple internal pipelines from the corresponding issue queue; and
a dispatch routing network for routing the output of the dispatch queues to the instruction execution slices such that the routing network dynamically varies the relationship between the dispatch queues and the plurality of parallel instruction execution slices according to execution requirements for the plurality of instruction streams and resource availability in the plurality of parallel instruction execution slices to select from among the plurality of instruction streams the instruction stream selected for execution by the parallel instruction execution slices, wherein the internal issue queues of the plurality of parallel instruction execution slices receive dispatched instructions of the selected instruction stream selected for execution by the parallel instruction execution slice in which they are included from the dispatch routing network, wherein two or more of the instruction execution slices are dynamically combinable to execute one or more instructions requiring a first execution unit bit width greater than a bit width of individual ones of the two or more instruction execution slices, wherein resources of the instruction execution slices used for executing the one or more instructions are also used when separately executing instructions requiring a second execution bit width equal to the bit width of the individual ones of the two or more instruction execution slices.

16. The processor core of claim 15, wherein the one or more instructions requiring a pipeline width greater than the individual ones of the two or more instruction execution pipelines are single-instruction multiple data (SIMD) instructions requiring greater pipeline width to process multiple data values operated on by the instructions.

* * * * *